(12) United States Patent
Alkhalifah et al.

(10) Patent No.: US 11,897,820 B2
(45) Date of Patent: Feb. 13, 2024

(54) GLASS FIBER REINFORCED POLYMER LINER FOR REINFORCED CONCRETE MOLTEN SULFUR STORAGE TANK

(71) Applicants: Saudi Arabian Oil Company, Dhahran (SA); King Fahd University of Petroleum and Minerals, Dhahran (SA)

(72) Inventors: Hassan Alkhalifah, Dhahran (SA); Muhammed Kalimur Rahman, Dhahran (SA); Sami Al-Ghamdi, Dhahran (SA); Ali Al-Gadhib, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1122 days.

(21) Appl. No.: 16/687,412

(22) Filed: Nov. 18, 2019

(65) Prior Publication Data

US 2021/0147306 A1 May 20, 2021

(51) Int. Cl.
*C04B 41/45* (2006.01)
*B65D 88/76* (2006.01)
(Continued)

(52) U.S. Cl.
CPC .......... *C04B 41/4596* (2013.01); *B65D 88/76* (2013.01); *C01B 17/02* (2013.01);
(Continued)

(58) Field of Classification Search
CPC ...... B65D 88/76; B65D 90/02; B65D 90/022; C01B 17/72; C01B 17/02; C04B 41/009;
(Continued)

(56) References Cited

U.S. PATENT DOCUMENTS

| 5,030,033 A | * | 7/1991 | Heintzelman | B65D 88/76 |
| | | | | 405/129.5 |
| 5,447,593 A | | 9/1995 | Tanaka et al. | |

(Continued)

FOREIGN PATENT DOCUMENTS

| DE | 3414914 A1 | 10/1984 |
| GB | 1522678 A | 8/1978 |

(Continued)

OTHER PUBLICATIONS

International Search Report and Written Opinion of PCT Application No. PCT/US2020/060925 dated Feb. 24, 2021: pp. 1-11.

(Continued)

*Primary Examiner* — Bryon P Gehman
(74) *Attorney, Agent, or Firm* — Bracewell LLP; Constance G. Rhebergen; Keith R. Derrington

(57) ABSTRACT

A system and method for storing molten sulfur includes a reinforced concrete vessel, the reinforced concrete vessel being subterranean. The vessel has a floor that is a raft footing formed of reinforced concrete and has a floor interior surface. The vessel also has a ceiling that is a slab of reinforced concrete and has a ceiling interior surface. Sidewalls of the vessel extend between the floor and the ceiling and are formed of reinforced concrete, each sidewall having a sidewall interior surface. A liner is bonded to the floor interior surface, the ceiling interior surface, and each sidewall interior surface. The liner formed of an epoxy vinyl ester resin, and a glass fiber sheet embedded in the epoxy vinyl ester resin.

20 Claims, 4 Drawing Sheets

(51) Int. Cl.
*C01B 17/02* (2006.01)
*C04B 41/00* (2006.01)
*C04B 41/63* (2006.01)
*E04H 7/18* (2006.01)
*C04B 41/48* (2006.01)
*C04B 111/23* (2006.01)

(52) U.S. Cl.
CPC ........ *C04B 41/009* (2013.01); *C04B 41/4853* (2013.01); *C04B 41/63* (2013.01); *E04H 7/18* (2013.01); *C04B 2111/23* (2013.01)

(58) Field of Classification Search
CPC . C04B 41/4596; C04B 41/4853; C04B 41/63; C04B 2111/23; E04H 7/18
See application file for complete search history.

(56) References Cited

U.S. PATENT DOCUMENTS

| | | | |
|---|---|---|---|
| 5,599,599 A | 2/1997 | Mirmiran et al. | |
| 5,607,527 A | 3/1997 | Isley, Jr. | |
| 6,672,798 B2 | 1/2004 | Pickren | |
| 10,538,383 B2* | 1/2020 | Al-Mehthel | B65D 90/022 |
| 2005/0266219 A1 | 11/2005 | Hodgson | |
| 2007/0272692 A1* | 11/2007 | Hiner | B65D 88/38 220/219 |
| 2012/0074150 A1* | 3/2012 | Wortmann | F24S 60/00 220/592.2 |
| 2012/0211391 A1 | 8/2012 | Al-Mehthel et al. | |

FOREIGN PATENT DOCUMENTS

| | | |
|---|---|---|
| GB | 2295637 B | 7/1998 |
| JP | 2013241782 A | 12/2013 |

OTHER PUBLICATIONS

Bogner et al., "FRP Linings in Aboveground Storage Tanks", The Arabian Journal for Science and Engineering, vol. 20 No. 2, pp. 361-368, Apr. 1995.

CL. Garvock, "Corrosion Resistant Liner: A Critical Choice", RPS Composites, Aug. 15, 2019, pp. 1-4.

Moller et al., "Acid-Resistant Organic Coatings for the Chemical Industry: A Review", Journal of Coatings Technology and Research, 14(2), 279-306, 2017.

Moon Fabricating Corporation, "Line for Longevity: Consider Fiberglass Reinforced Plastic (FRP) Linings in Your Tanks", May 10, 2018, pp. 1-5.

Yazdani et al., "Effect of Fiber-Reinforced Polymer Wrapping on Concrete Chloride Penetration and Concrete Cover", Transportation Research Record: Journal of the Transportation Research Board, No. 2441, pp. 98-104, 2014.

* cited by examiner

GLASS FIBER REINFORCED POLYMER LINER FOR REINFORCED CONCRETE MOLTEN SULFUR STORAGE TANK

BACKGROUND

1. Field of the Disclosure

The present disclosure relates in general to the field of protective liners for fluid storage vessels. In particular, the present invention is directed to a protective liner for the surfaces of a storage container to protect the container against molten sulfur and sulfuric acid.

2. Description of the Related Art

A sulfur pit used in natural gas and crude oil processing plants can include a concrete reinforced structure. Molten sulfur can stored in the sulfur pit where the structure is subjected to a high temperature in the range of 140 to 157 degrees Celsius. The molten sulfur has a significant amount of hydrogen sulfide ($H_2S$) and sulfur dioxide ($SO_2$) which are highly toxic and corrosive gasses. $H_2S$ is also flammable. The openings in the sulfur pit is heavily sealed to prevent leakage of these gasses. In the presence of moisture these gasses tend to form acidic vapors which can be sulfurous and be sulfuric acid.

SUMMARY OF THE DISCLOSURE

Reinforced concrete sulfur storage structures are subject to highly corrosive environment, which can result in cracking, leakage and in some cases collapse of the roof slabs. Damage to the storage structure can cause an interruption in operations and maintenance of the storage structures can be costly and time consuming. Damage to the storage structure can be caused by the vapors of acids generated from the molten sulfur coming in contact with residual moisture at an elevated temperature.

There is a growing concern regarding the emission of $H_2S$ gas and the related health and environmental hazards in natural gas and crude oil processing plants. There is a risk that a damaged storage structure could emit $H_2S$ gasses.

The acidic vapors which can be sulfurous and include sulfuric acid can attack the concrete elements inside the sulfur pit. The ceiling of the sulfur pit, the walls of the sulfur pit above the level of the molten sulfur inside the pit, and the columns supporting the roof slab are at particular risk of an acid attack. The sulfurous or sulfuric acid attacks the CH phase (portlandite) in the concrete to form gypsum, which is weak and friable and spalls off causing concrete corrosion.

The sulfurous acid is highly corrosive and as the acid diffuses into the concrete, the acid can reach the level of the reinforcing steel. The acid can then attack the carbon steel causing delamination of the concrete cover and spalling of the concrete. Further aggravation at the ceiling of the sulfur pit can result in the collapse of the roof of the pit.

The repair of cracks by epoxy injection is not feasible because of the elevated temperature of the walls of the sulfur pit. Similarly, the commonly available protective liners do not withstand the exposure conditions in the sulfur pits. The deteriorated concrete is generally prepared with ordinary Portland cement concrete or silica fume cement concrete. However, these two materials exhibit deterioration within a short period of time.

Repairs of currently available systems, in which the delaminated and spalled concrete in the pit is repaired with a patch using repair material, is performed during the shutdown of the sulfur recovery unit. However, a current problem with repairing with patches is that the patch spalls off again making the sulfur pit vulnerable to collapse and failure.

Embodiments of this disclosure provide systems and methods for applying and using a liner to protect the concrete structure of a subterranean reinforced concrete molten sulfur storage structure, which is commonly referred to as a "sulfur pit," that is used in the process of desulfurization of natural gas and crude oil. The liner can be formed of a non-metallic glass fiber reinforced polymer (GFRP) and can cover the interior walls and ceiling of the sulfur pit.

The GFRP liner can protect the concrete from damage caused by the molten sulfur and the resulting acidic vapors. The GFRP liner can be combined with a refractory layer made of cast potassium silicate or calcium aluminate that is used in the lower portion of the walls of the sulfur pit that are in direct contact with the molten sulfur.

The GFRP liner is bonded directly on to the concrete surfaces with the glass fiber sheets embedded in a matrix of ultra-high temperature vinyl ester or epoxy resin. The GFRP liner material is highly resistant to the sulfuric acid environment. The GFRP liner using high temperature resistant resin provides a liner that is stable under high temperature that exists in the molten sulfur storage tanks.

In an embodiment of this disclosure, a system for storing molten sulfur includes a reinforced concrete vessel. The reinforced concrete vessel is subterranean and has a floor that is a raft footing formed of reinforced concrete. The floor has a floor interior surface. A ceiling of the reinforced concrete vessel is a slab of reinforced concrete and the ceiling having a ceiling interior surface. Sidewalls extend between the floor and the ceiling that are formed of reinforced concrete. Each sidewall has a sidewall interior surface. A liner is bonded to the floor interior surface, the ceiling interior surface, and each sidewall interior surface. The liner is formed of an epoxy vinyl ester resin, and a glass fiber sheet embedded in the epoxy vinyl ester resin.

In alternate embodiments, each sidewall can meet both the floor and the ceiling at a right angle, and each sidewall can meet an adjacent sidewall at a right angle. The system can be at a temperature in a range of 150 to 260 degrees Celsius. Alternately, the system can be at a temperature greater than 204 degrees Celsius. A column can be spaced apart from each sidewall, the column extending between the floor and the ceiling. The liner can be bonded to an outer surface of the column. The epoxy vinyl ester resin can be an epoxy novolac vinyl ester. The epoxy vinyl ester resin can be a bisphenol epoxy vinyl ester. The epoxy vinyl ester resin can have a glass transition temperature that is greater than 204 degrees Celsius. The liner can have a thickness in a range of 3 mm to 8 mm. The glass fiber sheet can have uni-directional glass fibers.

In an alternate embodiment of this disclosure, a method for storing molten sulfur includes locating a reinforced concrete vessel under the earth's surface. The reinforced concrete vessel has a floor that is a raft footing formed of reinforced concrete. The floor has a floor interior surface. The reinforced concrete vessel also has a ceiling that is a slab of reinforced concrete, the ceiling having a ceiling interior surface. Sidewalls extend between the floor and the ceiling that are formed of reinforced concrete. Each sidewall has a sidewall interior surface. A glass fiber sheet is positioned on the floor interior surface, the ceiling interior surface, and each sidewall interior surface. An epoxy vinyl ester resin is applied to the glass fiber sheet so that the glass fiber sheet is embedded in the epoxy vinyl ester to form a liner that is bonded to each of the floor interior surface, the ceiling interior surface, and each sidewall interior surface.

In alternate embodiments, each sidewall can meet both the floor and the ceiling at a right angle, and each sidewall meets an adjacent sidewall at a right angle, the method further including overlapping a portion of the liner onto adjacent sections of the liner material that are extending from surfaces that define the right angle. The molten sulfur can be stored in the reinforced concrete vessel at a temperature in a range of 150 to 260 degrees Celsius. Alternately, the molten sulfur can be stored at a temperature greater than 204 degrees Celsius.

In other alternate embodiments, a column can be spaced apart from each sidewall, the column extending between the floor and the ceiling. The method can further include bonding the liner to an outer surface of the column. The epoxy vinyl ester resin can be an epoxy novolac vinyl ester. The epoxy vinyl ester resin can be a bisphenol epoxy vinyl ester. The epoxy vinyl ester resin can have a glass transition temperature that is greater than 204 degrees Celsius. The liner can have a thickness in a range of 3 mm to 8 mm. The glass fiber sheet can have uni-directional glass fibers.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
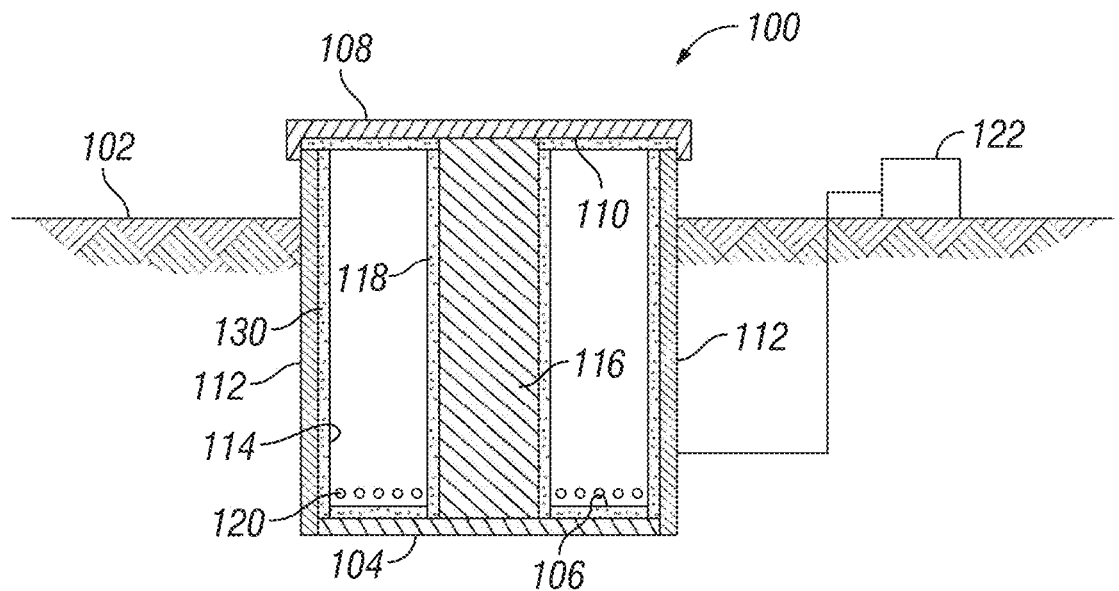
FIG. 1 is a section elevation view of a sulfur storage tank, in accordance with an embodiment of this disclosure.

Looking at FIG. 1, a system for storing molten sulfur can include sulfur pit 100. In an embodiment, the majority of sulfur pit 100 is below grade, meaning that more of sulfur pit 100 is below ground 102 level than is above ground level 102. In alternate embodiments, sulfur pit 100 can be entirely below ground 102 level. Sulfur pit 100 can be a newly constructed sulfur pit or can be an existing sulfur storage pit to be fitted with a liner.

Sulfur pit 100 can include a reinforced concrete vessel. The bottom of the vessel of sulfur pit 100 can include base slab 104. Base slab 104 can define a floor of sulfur pit 100 with floor interior surface 106. In an embodiment, base slab 104 can be a raft footing formed of reinforced concrete. As an example, base slab 104 can be formed of reinforced concrete with a compressive strength of 3000 to 6000 pounds per square inch (psi) or higher. In certain embodiments, non-coated Grade 60 steel with a yield strength of 60 kilopounds per square inch (ksi) can be used as the reinforcing material of the reinforced concrete of base slab 104. The thickness of base slab 104 will be dependent on certain design parameters, such as the size of sulfur pit 100 and soil conditions. Base slab 104 can have, for example, a thickness in a range of 12 to 30 inches (in). In an example embodiment, base slab 104 can have a thickness of about 18 in.

The top of the vessel of sulfur pit 100 can include roof slab 108. Roof slab 108 can define a ceiling having a ceiling interior surface 110. In an embodiment, roof slab 108 can be formed of reinforced concrete. Roof slab 108 can be formed, for example, of a cast in place concrete with a compressive strength ranging from 3000 to 6000 psi. Alternately, roof slab 108 can be formed of precast concrete elements. In certain embodiments, Grade 60 uncoated steel rebar with a yield strength of 60 ksi can be used as the reinforcing material of roof slab 108. The thickness of roof slab 108 will be dependent on certain design parameters, such as the size of sulfur pit 100. Roof slab 108 can have, for example, a thickness in a range of 12 to 18 in. In an example embodiment, roof slab 108 can have a thickness of about 16 in.

Sidewalls 112 can extend between base slab 104 and roof slab 108 to form the sides of the vessel of sulfur pit 100. Sidewalls 112 can define the sides of the vessel of sulfur pit and can have sidewall interior surface 114. In an embodiment, sidewalls 112 can be formed of reinforced concrete. The concrete material used to form sulfur pit 100 can be the same for the entire tank. Sidewalls 112 can be formed, for example, of a cast in place concrete with a compressive strength ranging from 3000 to 6000 psi. In certain embodiments, Grade 60 uncoated steel rebar with a yield strength of 60 ksi can be used as the reinforcing material of sidewalls 112. The thickness of sidewalls 112 will be dependent on certain design parameters, such as the size of sulfur pit 100 and soil conditions. Sidewalls 112 can have, for example, a thickness in a range of 12 to 26 in. In an example embodiment, sidewalls 112 can have a thickness of about 18 in. Each sidewall 112 can meet both the floor defined by base slab 104 and the ceiling defined by roof slab 108 at a right angle. Each sidewall 112 can also meet each adjacent sidewall 112 at a right angle.

The vessel of sulfur pit 100 can further include one or more column 116. Column 116 is spaced apart from each sidewall 112 and extends between the floor defined by base slab 104 and the ceiling defined by roof slab 108. Column 116 can have column outer surface 118. Column 116 can be formed of reinforced concrete. Column 116 can be formed, for example, of a cast in place concrete with a compressive strength ranging from 3000 to 6000 psi. In certain embodiments, Grade 60 uncoated steel rebar with a yield strength of 60 ksi can be used as the reinforcing material of column 116. The cross sectional area of column 116 will be dependent on certain design parameters, such as the size of sulfur pit 100, the amount of sulfur, and soil conditions. Column 116 can have, for example, cross sectional dimensions in a range of 16 to 24 inches square. In an example embodiment, column 116 can have cross sectional dimensions of 20 in by 20 in.

Column 116 can provide structural support to roof slab 108. In the embodiment of FIG. 1, a cross section of the vessel of sulfur put 100 is shown so that a width of the vessel of sulfur pit 100 is visible. The vessel of sulfur pit 100 can have a length that is multiple times the width of the vessel of sulfur pit 100. Column 116 can be particularly helpful when the vessel of sulfur pit 100 has an elongated length.

Figure 2:
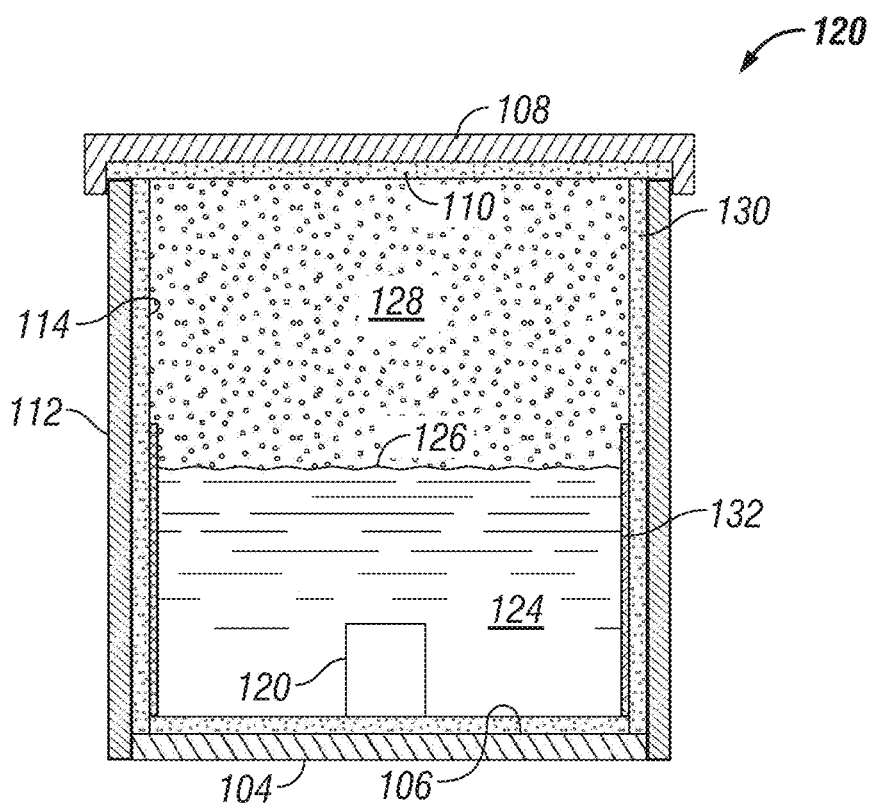
FIG. 2 is a section elevation view of a sulfur storage tank, in accordance with an embodiment of this disclosure, shown filled with molten sulfur.

Heater 120 can be used to heat molten sulfur inside sulfur pit 100. Heater 120 can be, for example, electric coils or steam tubing. In one embodiment, heater 120 can be coils of heating elements located inside sulfur pit 100, as shown in FIG. 1. Alternatively, the coils can be embedded or partially embedded in base slab 104 or sidewalls 112. In other embodiments, heater 120 can be an immersion heater that is placed within sulfur pit 100 (FIG. 2). In an alternate embodiment, no heater may be used in sulfur pit 100. Pump 122 can be used to pump sulfur into or out of pit 100.

Looking at FIG. 2, sulfur pit 100 can contain molten sulfur 124. During typical operations, the fluid level of molten sulfur 124 can be centered around fluid level 126 on sidewall 112. The fluid level can vary up and down. Vapor space 128 is the space above the fluid level. Because heater 120 is located in molten sulfur 124, heat is not readily transferred to roof slab 108 and the portion of sidewalls 112 above fluid level 126. Sulfur vapor can, thus, condense in these areas. Furthermore, sulfuric acid can be formed inside sulfur pit 100. In addition, if water vapor is present inside sulfur pit 100, the water vapor can react with the molten sulfur to create a sulfuric acid vapor. The sulfuric acid vapor can rise into vapor space 128 and attack sidewalls 112 and roof slab 108. The acid and acidic vapors generated inside the sulfur tank from the sulfur dioxide and hydrogen sulfide destroy the microstructure of concrete by reacting with calcium hydroxide in concrete to form very low strength gypsum product. The acid can penetrate further into the concrete to attack the reinforcing material which has been exposed and may then be attacked by other chemicals such as chloride.

Liner 130 can be a sulfuric acid resistant coating that is used to protect any or all of base slab 104, roof slab 108, sidewalls 112, and any columns 116 from attack by the molten sulfur and resulting acidic vapors generated within sulfur pit 100.

The sulfuric acid vapor of vapor space 128 may contact liner 130 that is bonded to the surfaces of roof slab 108, sidewalls 112, any columns 116, but liner 130 prevents the sulfuric acid vapor from contacting the underlying surface. The areas of roof slab 108, sidewalls 112, and any columns 116 above fluid level 126 can have a thicker layer of liner 130 than base slab 104 and areas of sidewalls 112, and any columns 116 below fluid level 126.

In some embodiments the areas of sidewall 112 and any columns 116 around and below fluid level 126 can include a lining of refractory material 132. Refractory material 132 can be, for example, cast potassium silicate or calcium aluminate.

In the region of fluid level 126, where the fluid level fluctuates, there can be significant damage to sidewall 112 and column 116 resulting from the interaction between moist atmospheric air and sulfur at the interface of molten 124 and vapor space 128. In an embodiment, the liner 130 can be thicker at the sidewall area around fluid level 126 to provide greater protection from damage. In embodiments wherein the sulfur storage apparatus uses refractory material 132 as a portion of the sidewall 112, the refractory material 132 can be applied to liner 130.

Liner 130 bonded to floor interior surface 106, ceiling interior surface 110, each sidewall interior surface 114, and the outer surface 118 of column 116. Liner 30 has a thickness in a range of 3 millimeters (mm) to 8 mm. Liner 130 is formed of a glass fiber sheet embedded in an epoxy vinyl ester resin to form a composite glass fiber reinforced polymer (GFRP) material. The ratio of fibers to resin can range from 20% fibers and 80% resin to 70% fibers and 30% resin, in each case by weight of liner 130. In general, the higher the fiber content, the higher the strength and stiffness of liner 130. In an example embodiment, liner 130 can include 65% fiber and 35% resin, by weight of liner 130.

The GFRP material is resistant to a sulfuric acid environment and can protect material from damage caused by molten sulfur and acidic vapors which can be sulfurous and be sulfuric acid.

Liner 130 can further be resistant to high temperatures. The epoxy vinyl ester resin used to form the GFRP material can have a glass transition temperature that is greater than 204 degrees Celsius. In certain embodiments, the epoxy vinyl ester resin used to form the GFRP material can have a glass transition temperature in a range of 204 degrees Celsius to 260 degrees Celsius. The GFRP material can be formed that is capable of withstanding sustained temperatures in excess of 204 degrees Celsius. In alternate embodiments, the sulfur pit 100 can be maintained at a temperature in a range of 150 degrees Celsius to 160 degrees Celsius and liner 130 can be formed of a GFRP material that is capable of withstanding sustained operating temperature in a range of 150 degrees Celsius to 260 degrees Celsius.

In example embodiments, the epoxy vinyl ester resin can be an epoxy novolac vinyl ester. In alternate example embodiments, the epoxy vinyl ester resin can be a bisphenol epoxy vinyl ester. The epoxy vinyl ester resin is highly corrosion resistant. The epoxy vinyl ester resin can provide resistance to high temperatures and to concentrated oxidizing acids, and can further be resistant to concentrated alkalis and salts.

The glass fiber sheet used to form the GFRP material can be a glass fiber sheet that has uni-directional glass fibers. The glass fiber sheets have a very high strength in the direction of the fibers. In the transverse direction the strength of the glass fiber sheet is lower. The glass fiber sheets will therefore be applied in an orientation to obtain a desired strength in a particular direction. The glass fiber sheet can be made from C-glass, E-glass, ECR-glass, R-glass, S-glass, or S2-glass types of glass fiber. As used in this disclosure, these types of glass fibers will be defined as follows: C-glass is a corrosive resistant glass made with calcium borosilicates and can be used in acid corrosive environments; E-glass is an alkali free, highly electrically resistive glass made with alumina-calcium borosilicates, which is known in the industry as a general-purpose fiber for its strength and electrical resistance; ECR-glass is an E-glass with greater acid corrosion resistance that is made with calcium aluminosilicates and used for acid corrosion resistance; R-glass is a reinforcement glass made with calcium aluminosilicates used where higher strength and acid corrosion resistance is needed; S-glass is a high strength glass made with magnesium aluminosilicates and used where high strength, high stiffness, extreme temperature resistance, and corrosive resistance is needed; and S-2 glass is a glass similar to, but with somewhat improved properties over S-glass.

In an example of operation, in order to store molten sulfur, such as in connection with natural gas and crude oil processing plants, a reinforced concrete vessel can be provided. The reinforced concrete vessel can be located under the earth's surface as a subterranean vessel. A glass fiber sheet can be positioned on floor interior surface 106, ceiling interior surface 110, each sidewall interior surface 114, and the outer surface 118 of column 116 of the reinforced concrete vessel.

Before positioning the glass fiber sheets, floor interior surface 106, ceiling interior surface 110, each sidewall interior surface 114, and the outer surface 118 of column 116 can be cleaned so that all traces of sulfur are removed from such surfaces. Floor interior surface 106, ceiling interior surface 110, each sidewall interior surface 114, and the outer surface 118 of column 116 can also be roughened to better form a bond between such surfaces and liner 130. In order to further improve bonding, a primer layer may first be applied to floor interior surface 106, ceiling interior surface 110, each sidewall interior surface 114, and the outer surface 118 of column 116.

Generally, the debonding of a liner from a concrete surface is dependent on the bond between the liner and the concrete surface. A strong bond prevents the peeling off of the liner from the concrete surface. Temperature plays an important role on the bond strength of the resin. At higher temperatures if the resin softens and the bond will degrade. The GFRP material of embodiments of this disclosure can have a strong insulating affect which can reduce the risk of debonding of liner 130 from interior surfaces of sulfur pit 100. Further, debonding of a liner from a concrete surface can be a result of the degradation of the liner. Degradation of a liner can take place due to a chemical attack, and in particular, the attack from the acid and sulfurous and sulfuric acid. As disclosed herein, liner 130 of embodiments of this disclosure provides resistance to acid attack which will further mitigate the risk of debonding of liner 130 from interior surfaces of sulfur pit 100.

An epoxy vinyl ester resin can be applied to the glass fiber sheet so that the glass fiber sheet is embedded in the epoxy vinyl ester to form liner 130 that is bonded to each of floor interior surface 106, ceiling interior surface 110, each sidewall interior surface 114, and the outer surface 118 of column 116. The GFRP material forming liner 130 will be applied at normal temperature inside the sulfur pit during the plant shut down for maintenance. Liner 130 will be subjected to gradually increasing temperature as the liquid sulfur flows into sulfur pit 100. When applying liner 130, the corners shall be smoothened or chamfered to create 45 degrees edges. Epoxy grout or mortar material can be utilized to make the smooth angles. In addition, at the corners, a separate piece of liner 130 can be overlapped onto the portions of liner material that are extending from the two sides that meet at and define the corner.

Liner 130 can have a final thickness in a range of 3 mm to 8 mm. In order to arrive at the final thickness of liner 130, multiple layers of glass fiber sheets and epoxy vinyl ester resin can be applied. In embodiments of this disclosure, a minimum of three layers of glass fiber sheets embedded in epoxy vinyl ester resin can be used to form liner 130. In alternate embodiments, the number of layers of glass fiber sheets embedded in epoxy vinyl ester resin used to form liner 130 can be, for example, in a range of one to five.

Figure 4:
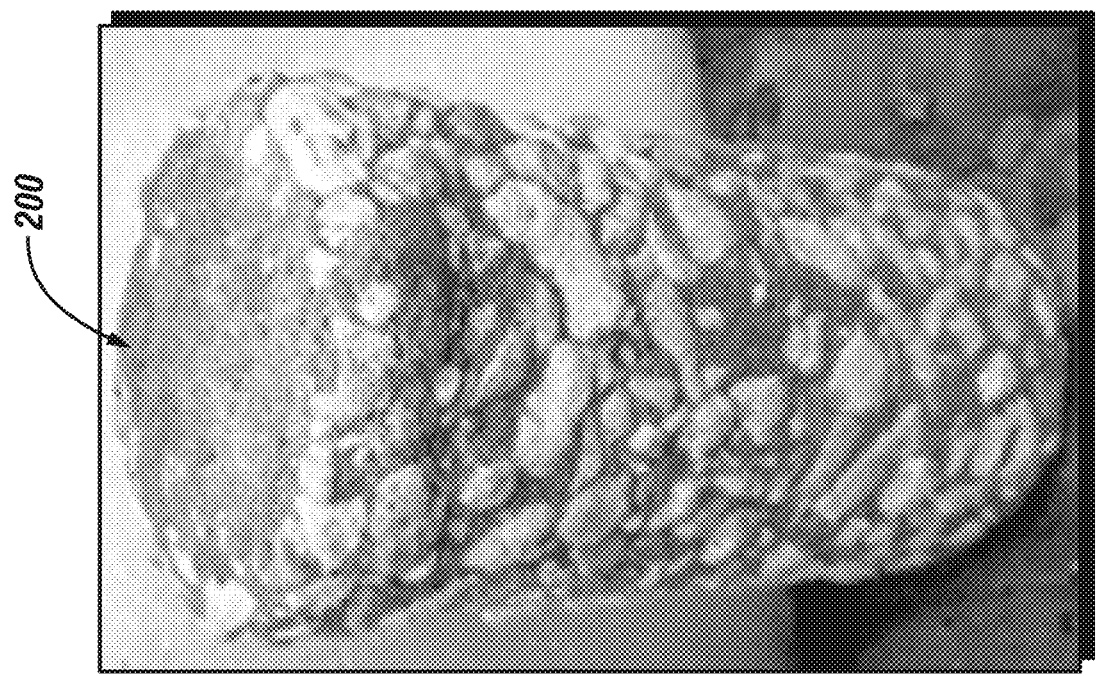
FIG. 4 is a perspective view of the concrete sample without a liner of FIG. 3, shown after being exposed to sulfuric acid.
Figure 3:
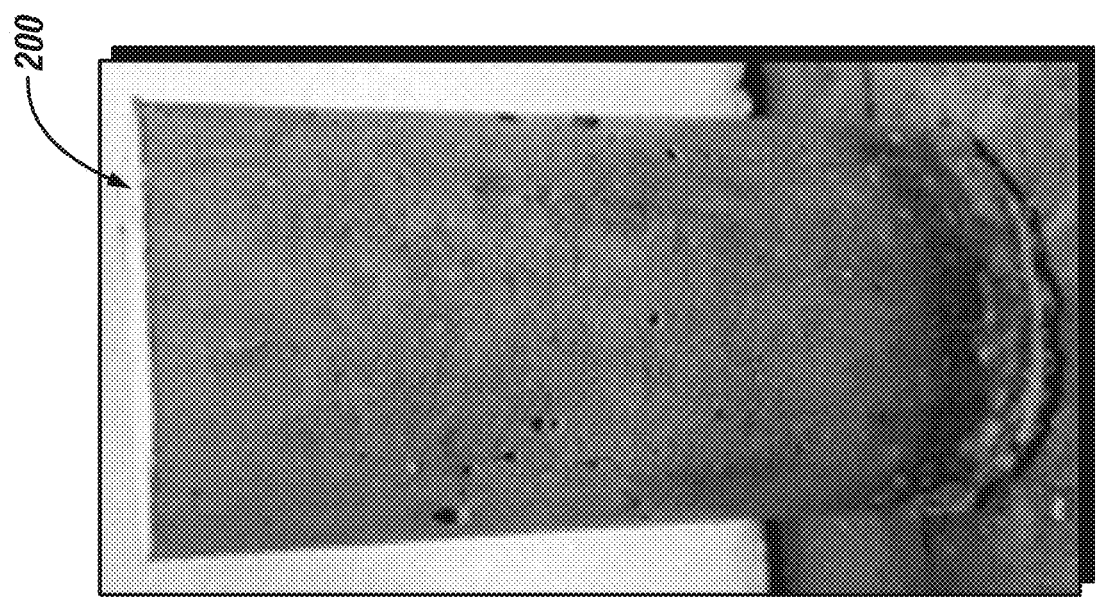
FIG. 3 is a perspective view of a concrete sample without a liner, shown before being exposed to sulfuric acid.

Laboratory experiments were performed to investigate the effect of sulfuric acid on various concrete samples that were subjected to high temperatures. Looking at FIGS. 3-4, a bare concrete cylinder 200 had a diameter of 3 in and a height of 6 in. Bare concrete cylinder 200 is formed of ordinary Portland concrete and were not reinforced. Bare concrete cylinder 200 was not coated with a GFRP liner. FIG. 3 shows bare concrete cylinder 200 before being exposed to sulfuric acid. Bare concrete cylinder 200 was subjected to dilute 5% sulfuric acid solution for a period of 12 weeks at a temperature of about 100 degrees Celsius. FIG. 4 shows bare concrete cylinder 200 after the 12 week period. Severe deterioration of bare concrete cylinder 200 was observed. Such deterioration reduced the mass and compressive strength of concrete cylinder 200.

Figure 6:
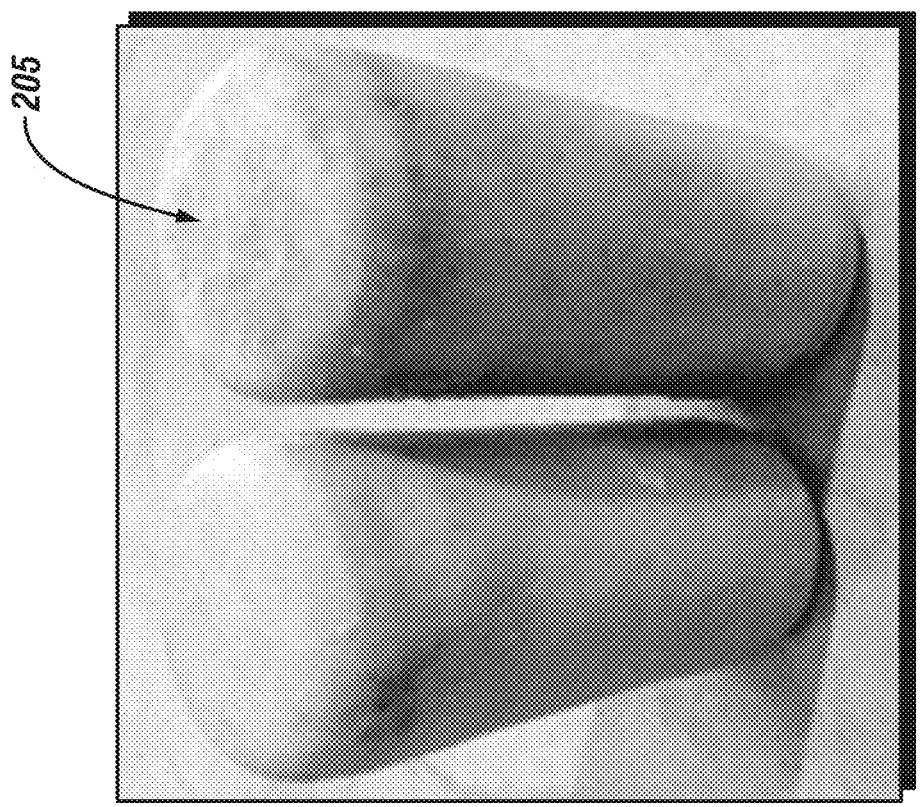
FIG. 6 is a perspective view of concrete samples of FIG. 5 with a liner, shown after being exposed to sulfuric acid.
Figure 5:
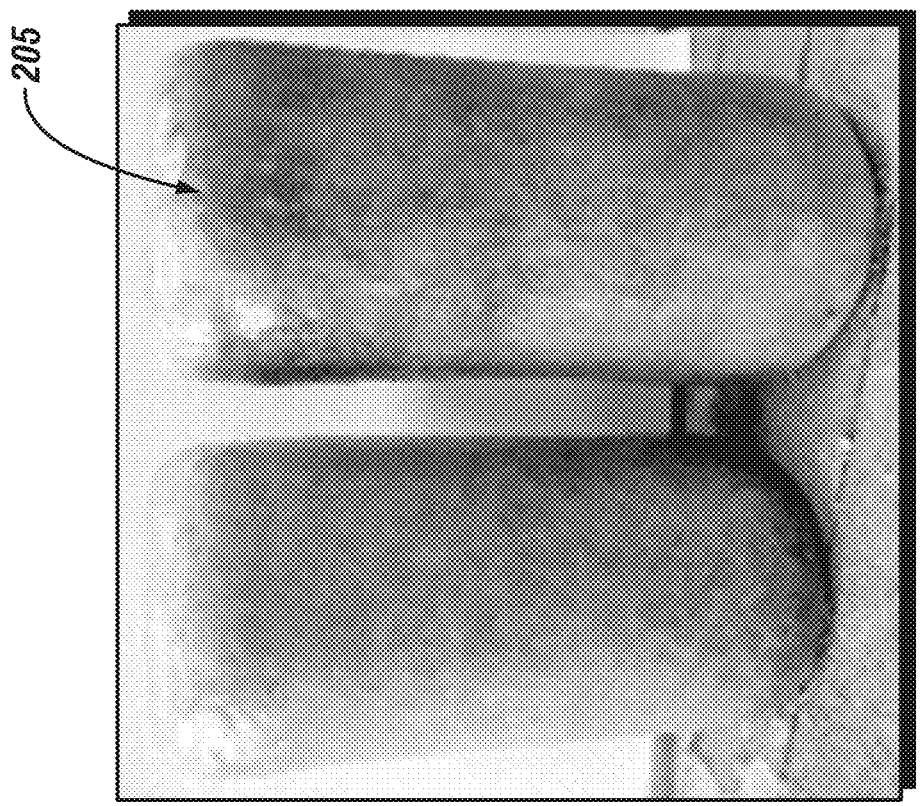
FIG. 5 is a perspective view of concrete samples with a liner of an embodiment of this disclosure, shown before being exposed to sulfuric acid.

Looking at FIGS. 5-6, coated concrete cylinder 205 had a diameter of 3 in and a height of 6 in before any liner was applied. Coated concrete cylinder 205 is formed of ordinary Portland concrete with a GFRP liner was bonded to the concrete. The GFRP liner was formed of epoxy novolac vinylester and type C-glass fibers. FIG. 5 shows coated concrete cylinder 205 before being exposed to sulfuric acid.

Coated concrete cylinder 205 was subjected to dilute 5% sulfuric acid solution for a period of 12 weeks at a temperature of about 100 degrees Celsius. FIG. 6 shows coated concrete cylinder 200 after the 12 week period. It can be seen that the GFRP liner provided excellent resistance to the attack by sulfuric acid. No damage to the GFRP liner was observed.

Figure 7:
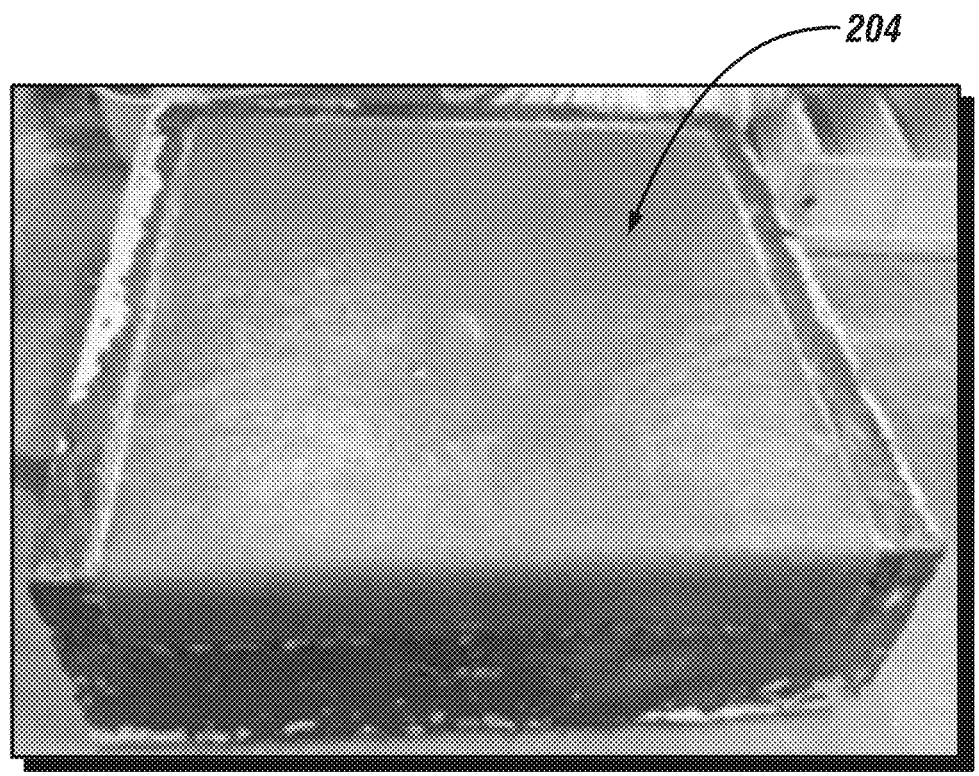
FIG. 7 is a perspective view of concrete slab with a liner of an embodiment of this disclosure.

The performance of a GFRP liner was also evaluated under high temperature conditions. A 3 mm thick GFRP liner was applied on a concrete slab 204 that measured 10 in×10 in in plan as shown in FIG. 7. The GFRP lined slab 204 was placed in an oven at a temperature of about 149 degrees Celsius for three weeks. The GFRP lined slab 204 after three weeks of exposure showed no deterioration or changes. After three weeks, a pullout test was conducted on the GFRP liner. It was observed that there was no deterioration in the pullout strength after the three week exposure to high temperature conditions.

Embodiments of this disclosure provide systems and methods for protecting concrete structures from an acidic environment at high temperature. The liner of this disclosure provides both the required bonding to the substrate, flexural modulus, the tensile and shear stress capacity, and stain elongation capacity to resist thermal loading. Embodiments of this disclosure further provide a bonding strength of at least 3.0 megapascal (MPa), as tested in accordance to ASTM D7522 Standard Test Method for Pull-Off Strength for FRP Bonded to Concrete Substrate Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A system for storing molten sulfur, the system including:
    a reinforced concrete vessel, the reinforced concrete vessel being subterranean and having:
        a floor that is a raft footing formed of reinforced concrete, the floor having a floor interior surface;
        a ceiling that is a slab of reinforced concrete, the ceiling having a ceiling interior surface; and
        sidewalls that extend between the floor and the ceiling that are formed of reinforced concrete, each sidewall having a sidewall interior surface; and
    a liner bonded to the floor interior surface, the ceiling interior surface, and each sidewall interior surface, the liner formed of:
        an epoxy vinyl ester resin; and
        a glass fiber sheet embedded in the epoxy vinyl ester resin and in contact with the interior surfaces.

2. The system of claim 1, where the glass fiber sheet comprises glass fibers, and wherein a ratio of epoxy vinyl ester resin weight to glass fiber weight is selected from the group consisting of 20:80, 70:30, and 65:35.

3. The system of claim 1, where the system contains sulfur at a temperature in a range of 150 to 260 degrees Celsius.

4. The system of claim 3, where the temperature exceeds 204 degrees Celsius.

5. The system of claim 3, further including a heater immersed inside the sulfur and a column spaced apart from each sidewall, the column extending between the floor and the ceiling, and where the liner is bonded to an outer surface of the column.

6. The system of claim 3, where the sulfur is molten and the liner has a thickness that is greater at an upper level of the molten sulfur.

7. The system of claim 1, where the epoxy vinyl ester resin is an epoxy novolac vinyl ester.

8. The system of claim 1, where the epoxy vinyl ester resin is a bisphenol epoxy vinyl ester.

9. The system of claim 1, where the epoxy vinyl ester resin has a glass transition temperature that is greater than 204 degrees Celsius.

10. The system of claim 1, where the glass fiber sheet has uni-directional glass fibers.

11. A method for storing molten sulfur, the method including:
    locating a reinforced concrete vessel under the earth's surface, the reinforced concrete vessel having:
        a floor that is a raft footing formed of reinforced concrete, the floor having a floor interior surface;
        a ceiling that is a slab of reinforced concrete, the ceiling having a ceiling interior surface; and
        sidewalls that extend between the floor and the ceiling that are formed of reinforced concrete, each sidewall having a sidewall interior surface, the floor, ceiling, and sidewall interior surfaces define vessel interior surfaces; and
    protecting the vessel interior surfaces from sulfur by,
        positioning a glass fiber sheet on the vessel interior surface, and
        embedding the glass fiber sheet in an epoxy vinyl ester resin after positioning the glass fiber sheet on the vessel interior surfaces to form a liner that is bonded to the vessel interior surfaces.

12. The method of claim 11, where each sidewall meets both the floor and the ceiling at a right angle, and each sidewall meets an adjacent sidewall at a right angle, the method further including overlapping a portion of the liner onto adjacent sections of the liner material that are extending from surfaces that define the right angle.

13. The method of claim 11, further including adding sulfur to the vessel, heating the sulfur, and storing the molten sulfur in the reinforced concrete vessel at a temperature in a range of 150 to 260 degrees Celsius.

14. The method of claim 13, where the molten sulfur is stored at a temperature greater than 204 degrees Celsius.

15. The method of claim 11, further including a column spaced apart from each sidewall, the column extending between the floor and the ceiling, and where the method further includes bonding the liner to an outer surface of the column.

16. The method of claim 11, where the epoxy vinyl ester resin is an epoxy novolac vinyl ester.

17. The method of claim 11, where the epoxy vinyl ester resin is a bisphenol epoxy vinyl ester.

18. The method of claim 11, where the epoxy vinyl ester resin has a glass transition temperature that is greater than 204 degrees Celsius.

19. The method of claim 11, where the liner has a thickness adjacent an upper surface of the molten sulfur, which is greater than a thickness of portions of the liner spaced away from the upper surface.

20. The method of claim 11, where the glass fiber sheet has uni-directional glass fibers.

* * * * *